United States Patent [19]

Hesson

[11] Patent Number: 5,157,624
[45] Date of Patent: Oct. 20, 1992

[54] MACHINE METHOD TO PERFORM NEWTON ITERATIONS FOR RECIPROCAL SQUARE ROOTS

[75] Inventor: James H. Hesson, Boise, Id.
[73] Assignee: Micron Technology, Inc., Boise, Id.
[21] Appl. No.: 630,111
[22] Filed: Dec. 13, 1990
[51] Int. Cl.⁵ .............................. G06F 7/552
[52] U.S. Cl. .................... 364/748; 364/752
[58] Field of Search ................. 364/748, 752

[56] References Cited

U.S. PATENT DOCUMENTS

| | | | |
|---|---|---|---|
| 4,336,599 | 6/1982 | Wong | 364/752 |
| 4,477,879 | 10/1984 | Wong | 364/752 |
| 4,823,301 | 4/1984 | Knierim | 364/748 |
| 4,878,190 | 10/1989 | Darley et al. | 364/752 |
| 4,999,801 | 3/1991 | Katsuno | 364/748 |
| 4,999,802 | 3/1991 | Cocanougher et al. | 364/748 |
| 5,053,631 | 10/1991 | Perlman et al. | 364/748 |

*Primary Examiner*—David H. Malzahn
*Attorney, Agent, or Firm*—Susan B. Collier

[57] ABSTRACT

The machine method of the present embodiment relates to iterative numerical techniques adapted for use in digital circuitry, such as floating- point multipliers and floating point adder-subtractor units. Using the Newton method of reciprocal square root computation of a value, several computational steps can be merged and performed with a single floating point multiplier unit.

34 Claims, 1 Drawing Sheet

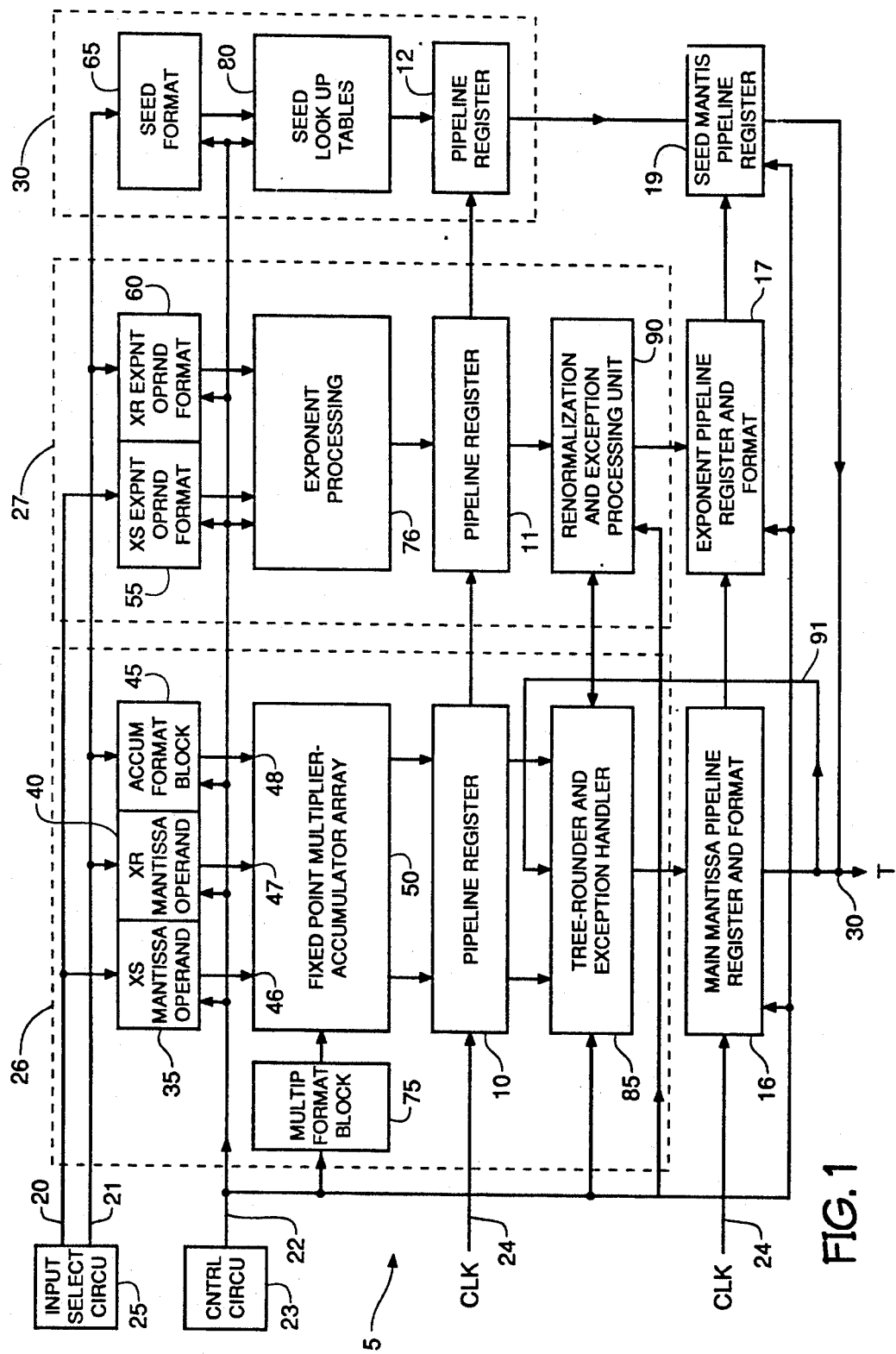

MACHINE METHOD TO PERFORM NEWTON ITERATIONS FOR RECIPROCAL SQUARE ROOTS

FIELD OF THE INVENTION

This invention relates to equipment for producing mathematical computations, and particularly for iterative calculations. Such equipment sometimes referred to as a mathematical "engine", usually is incorporated into a computer processor circuit, such as a CPM or a co-processor.

BACKGROUND OF THE INVENTION

Newton's Method is an iterative method that has proven to be an effective way to solve for the roots of a polynomial equation. It is particularly attractive as a computational method in a high speed computer when the computer has a hardware floating point multiplier and a hardware floating point adder-subtractor.

In the above case, a hardware implementation of Newton's method can be used to rapidly compute the floating point reciprocal or floating point reciprocal square root of an unknown value C which in turn can be used to compute floating point divide or square root operations.

In general, the Newton's method solves $F(x)=0$ given that the function $F(x)$ is defined and twice differentiable on the interval $(a,b)$. The algorithm is given as:

$$x_{(m+1)} = x_m - F(x_m)/F'(x_m)$$

where: $x_0 =$ is an initial approximation for $F(x)=0$,
$x_m =$ is the mth iteration,
$x_{(m+1)} =$ is the $(m+1)$st iteration, and
$F'(x_m) =$ is the first derivative of $F()$ evaluated at $x_m$.

Newton's Method for the specific case of determining reciprocal involves the solving:

$$F(x) = x^{-1} - C$$

and the Newton Iteration is given by:

$$x_{(m+1)} = x_m\{2 - cx_m\}$$

for $F(x)=0$, $x^{-1}=c$ and x is equal to the reciprocal of C.

Prior state-of-the-art hardware implementations have revolved around decomposing each Newton Iteration into the following successive computations:

| 1. | $cx_m$ | form the product of $x_m$ and C |
| 2. | $\{2 - cx_m\}$ | subtract the product from 2 |
| 3. | $x_m\{2 - cx_m\}$ | form the product |

Each step requires only the use of a multiplier or an adder. Hence, each Newton Iteration requires three operations.

The improved method forms the Newton Iteration in the following two steps versus the three steps as in prior art:

| 1. | $cx_m$ | form the product of $x_m$ and C |
| 2. | $x_m\{2 - cx_m\}$ | form the product and difference simultaneously. |

Newton's Method for the specific case of determining reciprocal square roots involves solving:

$$F(x) = x^{-2} - C = 0$$

and the Newton Iteration is given by:

$$x_{(m+1)} = 0.5 x_m \{3 - cx_m^2\}$$

for $F(x)=0$, $x^{-2}=C$ and x is the reciprocal square root of C.

Prior state of the art hardware implementations have revolved around decomposing each Newton Iteration into the following successive computations:

| 1. | $x_m^2$ | square $x_m$ |
| 2. | $cx_m^2$ | multiply the square of $x_m$ by C |
| 3. | $3 - cx_m^2$ | subtract the product from 3 |
| 4. | $x_m\{3 - cx_m^2\}$ | multiply the difference by $x_m$ |
| 5. | $.5x_m\{3 - cx_m^2\}$ | multiply the quantity by .5 |

Each step requires only the use of a multiplier or an adder. Hence, each Newton Iteration requires five operations.

The improved method forms the Newton Iteration in the following three steps versus the five steps as in prior art:

| 1. | $x_m^2$ | square $x_m$ |
| 2. | $cx_m^2$ | multiply the square of $x_m$ by C |
| 3. | $.5x_m\{3 - cx_m^2\}$ | form the product and difference simultaneously. |

SUMMARY OF THE INVENTION

The preferred embodiment of this invention provides an improved method for computing the reciprocal square root of an unknown value C using Newton's method.

The improved method forms the reciprocal square root Newton Iteration in the following three steps versus the five steps as in prior art:

| 1. | $x_m^2$ | square $x_m$ |
| 2. | $cx_m^2$ | multiply the square of $x_m$ by C. |
| 3. | $.5x_m\{3 - cx_m^2\}$ | steps 3 through 5 merged into one. |

Unlike prior art, each of the new steps requires only the use of a multiplier-accumulator. The improved method is 40% more efficient and hence computationally faster than prior methods.

The implementation of steps 1 and 2 as well as the initial seed generation of $x_0$ by lookup tables is well known in the art. The implementation of step 3 is of particular interest for the most widely used floating point number formats, the IEEE standard 32-bit and 64-bit formats. The improved method is detailed for the IEEE 64-bit floating point format but is readily applicable to IEEE single precision format as well.

BRIEF DESCRIPTION OF THE DRAWINGS

FIG. 1 is a block diagram of a functional unit used for reciprocal and reciprocal square root derivation of a value C.

DESCRIPTION OF PREFERRED EMBODIMENTS

The optimized implementation of Newton's method applied to the reciprocal and reciprocal square root is of particular interest for the most widely used floating point number formats, the IEEE standard 32-bit and 64-bit formats. The value of a normalized IEEE floating point number is given by:

$$z = \{-1^S\}\{2^{(ex-bias)}\}\{1.fz\}$$

where:
1. s is the sign of z, s={0 or 1};
2. ex is the biased exponent field (8 bits for single precision and 11 bits for double precision);
3. bias is the exponent bias where the bias=127 for single precision and the bias=1023 for double precision;
4. 1.fz is the mantissa, fz is the fraction field, and the 1 is the hidden bit; and
5. $fz = z_{(n-2)}z_{(n-3)} \ldots z_0$, where n=24 for single precision and n=53 for double precision floating point operands.

A complete specification of the IEEE floating point standard is found in *Introduction to Arithmetic for Digital Systems Designers*, CBS College Publishing, Dryden Press, 1982, by M. Flynn.

FIG. 1 illustrates an embodiment of the present invention as implemented by a functional unit 5 capable of performing single and double and mixed precision IEEE floating point multiplication, fixed point multiplication, floating point reciprocal and floating point reciprocal square root operations. The functional unit shown has a first internal pipeline register 10, a second internal pipeline register 11, a third internal pipeline register 12, a main mantissa pipeline register and format block 16, an exponent pipeline register and format block 17, and a seed mantissa output pipeline register 19.

The functional unit 5 has an XS input 20, an XR input 21, and a clock signal 24 used for internal timing of processing signals in the first internal pipeline register 10 and the main mantissa pipeline register and format block 16. The functional unit has a control signal 22 generated in a control circuit 23 according to a generated instruction opcode and the value of alpha. The opcode of an instruction contains the mnemonic for the instruction to be performed. For example, an add mnemonic indicates the instruction should do addition. Alpha is generated according to the reciprocal and reciprocal square root derivations of Tables 1 and 2 respectively.

Table 1 being the algorithm description for the reciprocal computation step $x_{(m+1)} = 2 - p_m$.

TABLE 1
RECIPROCAL COMPUTATION OF x(m+1):

where:
x(m+1) = x(m)(2 − p(m))
p(m) = cx(m)
p(m) = 2**(alpha)(1.fp), fp = p(n−2)p(n−3) ... p(0)
alpha = exponent value of p(m)
x(m) = (−1)sx 2(xexp − bias)( 1.fx)
xexp = biased exponent of x(m)
bias = IEEE bias value 1023 for double and 127 for single precision floating point
fx = x(n−2)x(n−3) ... x(0), x(m) fraction field CASE 1. p(m) exponent value (alpha) = −1
x(m+1) =

TABLE 1-continued
RECIPROCAL COMPUTATION OF x(m+1):

{{ 1.0$\overline{p(n-2)}$ $\overline{p(n-3)}$ ... $\overline{p(0)}$ }{ 1.x(n−2)x(n−3) ... x(0) } +
2(−n){ 1.x(n−2)x(n−3) ... x(0) }} {(−1)sx} 2**(xexp − bias)

CASE 2. p(m) exponent value (alpha) = 0
x(m+1) =

{{ $\overline{p(n-2)}$ . $\overline{p(n-3)}$ ... $\overline{p(0)}$ }{ 1.x(n−2)x(n−3) ... x(0) } +
2(−n+2){ 1.x(n−2)x(n−3) ... x(0) }} {(−1)sx} 2**(xexp − bias −1)

Table 2 being the algorithm description for the reciprocal square root computation step $x_{(m+1)} = 0.5x_m(3 - p_m)$.

TABLE 2
RECIPROCAL SQUARE ROOT COMPUTATION OF x(m+1):

where:
x(m+1) = .5x(m)(1 − p(m))
p(m) = cx(m)**2
p(m) = 2**(alpha)(1.fp), fp = p(n−2)p(n−3) ... p(0)
alpha = exponent value of p(m)
x(m) = (−1)sx 2(xexp − bias)( 1.fx)
xexp = biased exponent of x(m)
bias = IEEE bias value 1023 for double and 127 for single precision floating point
fx = x(n−2)x(n−3) ... x(0), x(m) fraction field CASE 1. p(m) exponent value (alpha) = 0
x(m+1) =

{{ 1.$\overline{p(n-2)}$ $\overline{p(n-3)}$ ... $\overline{p(0)}$ }{ 1.x(n−2)x(n−3) ... x(0) } +
2(−n+1){ 1.x(n−2)x(n−3) ... x(0) }} {(−1)sx} 2**(xexp − bias − )

CASE 2. p(m) exponent value (alpha) = −1
SUBCASE 1. p(0) = 0
x(m+1) =

{{ 1.00$\overline{p(n-2)}$ $\overline{p(n-3)}$ ... $\overline{p(1)}$ }{ 1.x(n−2)x(n−3) ... x(0) } +
2(−n−1){ 1.x(n−2)x(n−3) ... x(0) }} {(−1)sx} 2**(xexp − bias)

SUBCASE 2. p(0) = 1
x(m+1) =

{{ 1.00$\overline{p(n-2)}$ $\overline{p(n-3)}$ ... $\overline{p(1)}$ }{ 1.x(n−2)x(n−3) ... x(0) } +
2(−n){ 1.x(n−2)x(n−3) ... x(0) }} {(−1)sx} 2**(xexp − bias)

The XS input 20 and the XR input 21 are variable according to which iteration the unit is processing and are determined in an input select circuit 25.

The functional unit 5 is composed of a mantissa processing section 26, an exponent section 27 and a seed unit section 30. The mantissa processing section 26 has an XS mantissa operand format block 35, an XR mantissa operand format block 40, and an accumulator format block 45 for providing input parts 46, 47 and 48 for XS, XR and accumulate input operands respectively to a fixed point multiplier-accumulator array 50.

The exponent section 27 has an XS exponent operand format block 55 and an XR exponent operand format block 60. Seed unit section 30 has a seed format block 65.

The fixed point multiplier-accumulator array 50 has a multiplier format block 75 for controlling the format of the multiplier so that a two's complement or binary multiplication can be performed.

An exponent processing unit 76 is used in the multiplication of floating point numbers and in the generation of a seed exponent for reciprocal and reciprocal square root operations. The seed lookup tables unit 80 is used in the generation of mantissa seed values for either the reciprocal or reciprocal square root of an input. The control signals 22 are used to select the desired input format select options (i.e. control the multiplexers) as well as select the main mantissa pipeline register and format block 16, the exponent pipeline register and format block 17, and the seed mantissa output pipeline register 19. In the case of fixed point operations, the full 64-bit main mantissa pipeline register and format block 16 is selected. In any case the final computation of the reciprocal square root of the value C is available at output node 30.

The second stage operations of the mantissa processing section 26 are performed in circuitry located below the first internal pipeline register 10. The second stage operations include the addition of the sum and carry outputs of the fixed point multiplier-accumulator array 50. The result of any preceding fixed point computation is also added as required to perform a two cycle double precision operation. Furthermore, the mantissa processing section 26 performs rounding and exception handling of the result in the multi-input adder tree rounder and exception handler 85. Control is bidirectional to and from the multi-input adder tree rounder and exception handler 85 and the second stage of a renormalization and exception processing unit 90 in the exponent section 27. The general operation of the multi-input adder tree rounder and exception handler 85 and renormalization and exception processing unit 90 is understood by those versed in the art and is described in *Journal of Research and Development*, Vol. 34, No. 1, pp. 111–120, Jan. 1990.

The XS input and the XR input are determined by an input selection circuit 25 in order to accommodate the steps of the iteration shown in Tables 3 and 4.

Table 3 indicates the complete sequence for a double precision reciprocal operation.

TABLE 3

| | RECIPROCAL ITERATIONS | | |
|---|---|---|---|
| COMPUTATION | XR OPERAND | XS OPERAND | COMMENTS |
| 1. x(0) | c | — | seed lookup |
| 2. p(0) = cx(0) | x(0) | c | mixed precision with feedback = 0 |
| 3. x(1) = x(0) (2 − p(0)) | x(0) | p(0) | mixed precision with feedback = 0 |
| 4. p(1) = cx(1) | x(1) | c | mixed precision with feedback = 0 |
| 5. x(2) = x(1) (2 − p(1)) | x(1) | p(1) | mixed precision with feedback = 0 |
| 6. p(2) = cx(1) | x(1) | c | fixed point, full c LSB's of x(1) |
| 7. p(2) = cx(1) | x(1) | c | mixed precision with feedback from step 6. |
| 8. x(3) = x(2) (2 − p(2)) | x(2) | p(2) | fixed point, full p(2) LSB's of x(2) |
| 9. x(3) = x(2) (2 − p(2)) | x(2) | p(2) | mixed precision with feedback from step 8. |

Table 4 indicates the complete sequence for a double precision reciprocal square root operation.

TABLE 4

| | RECIPROCAL SQUARE ROOT ITERATIONS | | |
|---|---|---|---|
| COMPUTATION | XR OPERAND | XS OPERAND | COMMENTS |
| 1. x(0) | c | — | seed lookup |
| 2. q(0) = x(0)x(0) | x(0) | x(0) | mixed precision with feedback = 0 |
| 3. p(0) = cq(0) | q(0) | c | mixed precision with feedback = 0 |
| 4. x(1) = .5X(0) (3 − p(0)) | x(0) | p(0) | mixed precision with feedback = 0 |
| 5. q(1) = x(1)x(1) | x(1) | x(1) | mixed precision with feedback = 0 |
| 6. p(1) = cq(1) | q(1) | c | mixed precision with feedback = 0 |
| 7. x(2) = .5X(1) (3 − p(1)) | x(1) | p(1) | mixed precision with feedback = 0 |
| 8. q(2) = x(2)x(2) | x(2) | x(2) | fixed point, full x(2) LSB's of x(2) |
| 9. q(2) = x(2)x(2) | x(2) | x(2) | mixed precision with feedback from step 8. |
| 10. p(2) = cq(2) | q(2) | c | fixed point, full c LSB's of q(2) |
| 11. p(2) = cq(2) | q(2) | c | mixed precision with feedback from step 10. |
| 12. x(3) = .5x(2) (3 − p(2)) | x(2) | p(2) | fixed point, full p(2) LSB's of x(2) |
| 13. x(3) = .5x(2) (3 − p(2)) | x(2) | p(2) | mixed precision with feedback from step 12. |
| 14. q(3) = x(3)x(3) | x(3) | x(3) | fixed point, full x(3) LSB's of x(3) |
| 15. q(3) = x(3)x(3) | x(3) | x(3) | mixed precision with feedback from step 14. |
| 16. p(3) = cq(3) | q(3) | c | fixed point, full c LSB's of q(3) |

TABLE 4-continued

| | RECIPROCAL SQUARE ROOT ITERATIONS | | |
|---|---|---|---|
| COMPUTATION | XR OPERAND | XS OPERAND | COMMENTS |
| 17. p(3) = cq(3) | q(3) | c | mixed precision with feedback from step 16. |
| 18. x(3) = .5x(3) (3 − p(3)) | x(3) | p(3) | fixed point, full p(3) LSB's of x(3) |
| 19. x(3) = .5x(3) (3 − p(3)) | x(3) | p(3) | mixed precision with feedback from step 18. |

Tables 5 through 9 and the value of alpha from Tables 1 and 2 are used internally in the XS mantissa operand format block 35, XR mantissa operand format block 40, accumulator format block 45, XS exponent format block 55, and XR exponent operand format block 60 to select the input mantissa and exponent fields of the XS input and the XR input and the fixed point multiplier-accumulator according to a given control signal in order to normalize the inputs.

Table 5 indicates outputs a53f–a0f that will be selected in the XS mantissa operand format block 35 depending on which control signal, A–J, is selected.

Table 6 indicates outputs b31f–b0f that will be selected in the XR mantissa operand format block 40 depending on which control signal, A–H, is selected.

Table 7 indicates outputs z33–z0 that will be selected in the accumulator operand format block 45 depending on which control signal, A–E, is selected.

Table 8 indicates outputs se10–se0 that will be selected n the XS exponent operand format block 55 depending on which control signal, A–F, is selected.

Table 9 indicates outputs re10–re0 that will be selected in the XR exponent operand format block 60 depending on which control signal, A–F, is selected.

TABLE 5

| | select the output a53f–a0f according to the select control terms A through J ($-\!-\!-$ denotes bit complement) | | | | | | | | |
|---|---|---|---|---|---|---|---|---|---|
| select terms | a53f | a52f | a51f | a50f | a49f | ... | a2f | a1f | a0f |
| A | 1 | xs51 | xs50 | xs49 | xs48 | ... | xs1 | xs0 | 0 |
| B | 1 | 0 | 0 | 0 | 0 | ... | 0 | 0 | 0 |
| C | $\overline{xs51}$ | $\overline{xs50}$ | $\overline{xs49}$ | $\overline{xs48}$ | $\overline{xs47}$ | ... | $\overline{xs0}$ | 0 | 0 |
| D | 1 | 0 | $\overline{xs51}$ | $\overline{xs50}$ | $\overline{xs49}$ | ... | $\overline{xs2}$ | $\overline{xs1}$ | $\overline{xs0}$ |
| E | 1 | xs22 | xs21 | xs20 | xs19 | ...xs0... | 0 | 0 | 0 |
| F | 1 | xs54 | xs53 | xs52 | xs51 | ...xs32... | 0 | 0 | 0 |
| G | xs31 | xs30 | xs29 | xs28 | xs27 | ...xs0... | 0 | 0 | 0 |
| H | xs63 | xs62 | xs61 | xs60 | xs59 | ...xs32... | 0 | 0 | 0 |
| I | 1 | $\overline{xs51}$ | $\overline{xs50}$ | $\overline{xs49}$ | $\overline{xs48}$ | ... | $\overline{xs1}$ | $\overline{xs0}$ | 0 |
| J | 1 | 0 | 0 | $\overline{xs51}$ | $\overline{xs50}$ | ... | $\overline{xs3}$ | $\overline{xs2}$ | $\overline{xs1}$ |

TABLE 6

| | select the bf31f–b0f outputs according to the select control A through H | | | | | | | | |
|---|---|---|---|---|---|---|---|---|---|
| select terms | b31f | b30f | b29f | b28f | b27f | ... | b2f | b1f | b0f |
| A | 1 | xr51 | xr52 | xr51 | xr50 | ... | xr23 | xr22 | xr21 |
| B | xr20 | xr19 | xr18 | xr17 | xr16 | ...xr0... | 0 | 0 | 0 |
| C | 1 | 0 | 0 | 0 | 0 | | 0 | 0 | 0 |
| D | 1 | 0 | 0 | 0 | 0 | | 0 | 0 | 0 |
| E | 1 | xr22 | xr21 | xr20 | xr19 | ...xr0... | 0 | 0 | 0 |
| F | 1 | xr54 | xr53 | xr52 | xr51 | ...xr32... | 0 | 0 | 0 |
| G | xr31 | xr30 | xr29 | xr28 | xr27 | ... | xr2 | xr1 | xr0 |
| H | xr63 | xr62 | xr61 | xr60 | xr59 | ... | xr34 | xr33 | xr32 |

TABLE 7

| a. Select the z33–z0 bits according to the control signals A through E | | | | | | | | | |
|---|---|---|---|---|---|---|---|---|---|
| select terms | z33 | z32 | z31 | z30 | z29 | z28 | z27 | z26 | ... z0 |
| A | 0 | 0 | 0 | 0 | 0 | 0 | 0 | 0 | 0 |
| B | 1 | xr51 | xr50 | xr49 | xr48 | xr47 | xr46 | xr45 | ... xr19 |
| C | 0 | 1 | xr51 | xr50 | xr49 | xr48 | xr47 | xr46 | ... xr20 |
| D | 0 | 0 | 1 | xr51 | xr50 | xr49 | xr48 | xr47 | ... xr21 |
| E | 0 | 0 | 0 | 1 | xr51 | xr50 | xr49 | xr48 | ... xr22 |

TABLE 8

| a. generate se10–se0 using the control select terms A through F | | | | | | | | | | | |
|---|---|---|---|---|---|---|---|---|---|---|---|
| se10 | se9 | se8 | se7 | se6 | se5 | se4 | se3 | se2 | se1 | se0 | control select |
| xs62 | xs61 | xs60 | xs59 | xs58 | xs57 | xs56 | xs55 | xs54 | xs53 | xs52 | A |
| 0 | 0 | 0 | 0 | 0 | 0 | 0 | 0 | 0 | 0 | 0 | B |
| 0 | 1 | 1 | 1 | 1 | 1 | 1 | 1 | 1 | 1 | 0 | C |
| 0 | 1 | 1 | 1 | 1 | 1 | 1 | 1 | 1 | 1 | 1 | D |
| xs30 | xs29 | xs28 | xs27 | xs26 | xs25 | xs24 | xs23 | 0 | 0 | 0 | E |

TABLE 8-continued

| a. generate se10-se0 using the control select terms A through F | | | | | | | | | | | |
|---|---|---|---|---|---|---|---|---|---|---|---|
| se10 | se9 | se8 | se7 | se6 | se5 | se4 | se3 | se2 | se1 | se0 | control select |
| xs62 | xs61 | xs60 | xs59 | xs58 | xs57 | xs56 | xs55 | 0 | 0 | 0 | F |

TABLE 9

| generate the re10-re0 output bits control select terms A through F | | | | | | | | | | | |
|---|---|---|---|---|---|---|---|---|---|---|---|
| re10 | re9 | re8 | re7 | re6 | re5 | re4 | re3 | re2 | re1 | re0 | control term |
| xr62 | xr61 | xr60 | xr59 | xr58 | xr57 | xr56 | xr55 | xr54 | xr53 | xr52 | A |
| 0 | 1 | 1 | 1 | 1 | 1 | 1 | 1 | 1 | 1 | 0 | B |
| 0 | 1 | 1 | 1 | 1 | 1 | 1 | 1 | 0 | 0 | 0 | C |
| 0 | 1 | 1 | 1 | 1 | 1 | 1 | 1 | 1 | 1 | 0 | D |
| xr30 | xr29 | xr28 | xr27 | xr26 | xr25 | xr24 | xr23 | 0 | 0 | 0 | E |
| xr62 | xr61 | xr60 | xr59 | xr58 | xr57 | xr56 | xr55 | 0 | 0 | 0 | F |

It is highly desirable that the XS input and XR input be normalized, as this eliminates the time consuming task of a renormalization that would otherwise be required prior to multiplication. The handling of denormalized inputs are performed under the direction of a trap handling routine which is well-known in the art.

The embodiment shown in the Functional Unit 5 of FIG. 1 performs a full rounded floating point multiply in two cycles by combining the first cycle fixed point product result via the feedback path 91 with the second stage mixed precision floating point result. In this manner, a full double precision operation can be performed every two machine cycles. The mantissa and multiplicand of the fixed point multiply product are the full mantissa of the XS mantissa operand (1.XS53−XS0) and the lower 21 bit mantissa of (XR20−XR0) for the XR mantissa operand. The fixed point product result is right shifted. It is then added via the feedback path 91 with the result from a mixed precision floating point computation. This computation consists of the full double precision XS mantissa and exponent operand and mixed precision XR operand. The XR operand of the mixed precision product consists of the entire XR exponent and sign field and the most significant 32 bits of the mantissa full (1.XR51−XR0), i.e. (1XR51−XR21).

Tables 3 and 4 are specific examples of the steps performed in the iterative method of the present embodiment. The XS input 20 and the XR input 21 are determined by an input selection circuit 25 in order to accommodate the steps. The XS and XR inputs are normalized in the operand format blocks before any circuit computations take place. Table 3 provides a useful example of the iterative steps. The value C becomes the first XR input and there is no XS input. Using seed lookup, the computation x is performed by the seed unit section 30 using C as its input. The result $x_0$ from step 1 becomes the XR input with C as the XS input to compute the product $p_0 = cx_0$ of step 2. In step 2, the mixed computation $p_0 = cx_0$ is performed with 0 feedback. In step 3, the XR input is result $x_0$ from step 1 and the XS input is result $p_0$ from step 2. In step 3, the mixed precision computation $x_1 = x_0(2 - p_0)$ is performed with 0 feedback. In step 4, the XR input is the result $x_1$ from step 3 and the XS input is C. In step 4, the mixed precision computation $p_1 = cx_1$ is performed with 0 feedback. In step 5, the XR input is the result $x_1$ from step 3 and the XS input is the result $p_1$ from step 4. In step 5, the mixed computation $x_2 = x_1(2 - p_1)$ is performed with 0 feedback. In step 6, the XR input is result $x_1$ from step 3 and the XS input is C. In step 6, the fixed point computation $p_2 = cx_1$ is performed on the full C operand and the LSB's of $x_1$. In step 7, the XR input is the result $x_1$ from step 3 and the XS input is C. In step 7, the mixed precision computation $p_2 = cx_1$ is summed with the feedback from step 6 to form a double precision result, $p_2$. In step 8, the XR input is the result $x_2$ from step 5 and the XS input is the result $p_2$ from step 6. In step 8, the fixed point computation $x_3 = x_2(2 - p_2)$ is performed for the full $p_2$ and the LSB's of $x_2$. In the final step 9, the XR input is the result $x_2$ from step 5 and the XS input is the result $p_2$ from step 6. In step 9, the mixed precision computation $x_3 = x_2(2 - p_2)$ is summed with feedback from step 8 to form the double precision result, $x_3$.

Single precision floating point operations, mixed precision operations (one operand full double precision, one operand with full exponent but truncated mantissa) and fixed point operations each require one machine cycle.

FLOATING RECIPROCAL COMPUTATION OF $x_{(m+1)} = x_m(2 - p_m)$

The implementation of the optimized reciprocal operations by the Functional Unit 5 shown in FIG. 1 is better understood by referring to Table 1 and the operand format Tables 5-9. From Table 1, the optimized operation at the mth iteration $x_{(m+1)} = x_m(2 - p_m)$, where $p_m = 2^\alpha(1.\text{fp})$ is broken down into two cases according to the key observation that the exponent value of $p_m$ is either $-1$ or 0. Indeed, for performing the computation $x_{(m+1)}$ both the instruction opcode generated and the value of alpha are used to control the XS mantissa operand format block 35 and the XS exponent operand format block 55 as well as the accumulator format block 45.

For the case of alpha $= -1$, the iteration $x_{(m+1)}$ is formed as indicated in Table 1 and Tables 5-9 with the XS mantissa operand selected as term D from Table 5 and the XS exponent operand selected as term D from Table 8. The accumulator operand is selected as term A from Table 7 for the first cycle of a two cycle full precision computation and as term D from Table 7 for the second cycle. The XR mantissa operand is selected as term A from Table 6 for the second iteration as term B from Table 6 for the first iteration of the two cycle full precision floating point operation of $x_{(m+1)}$. Similarly, the XR exponent operand is selected as term A from Table 9 for the second iteration. For all fixed point operations and in particular the first iteration of a two cycle floating point operation, the XR and XS exponent operands are not applicable.

Referring to Tables 1 and Tables 5-9 once again, the optimized reciprocal computation of $x_{(m+1)}$ for the case of alpha $= 0$ requires from Table 5 the term C for the XS mantissa operand for both the first and second cycle of a double precision computation of $x_{(m+1)} = x_m(2-p_m)$. From Table 8, the term C is selected for the XS exponent operand. From Table 7, the accumulator operand is selected as term C for the second cycle of the two cycle double precision operation and zero, and as term A from Table 7 for the first cycle. Similarly, for the case of alpha=0, the XR mantissa operand is selected from Table 6 as term B for the first cycle and as term A from Table 6 for the second cycle. Finally, from Table 9 the XR exponent is selected as term A for the second cycle and is not applicable for the fixed point first cycle of the two cycle double precision computation of $x_{(m+1)}$.

As Newton's method approximately doubles precision upon every iteration, only the last iteration requires performing the two cycle full double precision operation. Hence, for all computations of $x_{(m+1)}$ leading up to the last iteration, only the single cycle operation using the mixed precision operation using item A of the XR Table 6 is required.

Table 3 illustrates the complete sequence for a double precision reciprocal computation. Note, that a mixed precision operation is sufficient for steps 2 through 5 and that a two cycle double precision operation is required for steps 6-9 since these steps are associated with the final iteration. The round to nearest rounding mode specified by the IEEE floating point format should be enabled for all operations for full accuracy.

FLOATING RECIPROCAL SQUARE ROOT COMPUTATION OF $x_{(m+1)} = 0.5x_m(3-p_m)$

The implementation of the optimized reciprocal operations by the Functional Unit 5 in FIG. 1 is better understood by referring to Table 2 and the operand format Tables 5-9. From Table 2, the optimized operation at the mth iteration $x_{(m+1)} = 0.5x_m(3-p_m)$, where $p_m = 2^\alpha(1.fp)$ is broken down into two cases according to the key observation that the exponent value of $p_m$ is either $-1$ or 0. Indeed, for performing the computation $x_{(m+1)}$ both the instruction opcode generated control and the value of alpha are used to control the XS mantissa operand format block 35, the XS exponent operand format block 55 as well as the accumulator format block 45.

For the case of alpha=$-1$, there are two additional subcases that permit the full accuracy result to be computed without the need to increase the multiplier width from 54 to 55 bits. From Table 2, the two subcases for alpha=$-1$ correspond to the value of the least significant bit $p_0$. The value of $p_0$ effects a change in the accumulator format block only. For $p_0=0$, the iteration $x_{(m+1)}$ is formed as indicated in Table 2 with the XS mantissa operand selected as term J from Table 5 and the XS exponent operand selected as term D from Table 8. The accumulator operand is selected from Table 7 as term A for the first cycle of a two cycle full precision computation and as term D from Table 7 for the second cycle. The XR mantissa operand is selected from Table 6 as term A for the second iteration and as term B for the first iteration of the two cycle full precision floating point operation of $x_{(m+1)}$. Similarly, the XR exponent operand is selected from Table 9 as term A for the second iteration. For the subcase of $p_0=1$ only the accumulator selection is different with term C selected from Table 7 for the second cycle and term A selected from Table 7 for the fixed point first cycle computation. For all fixed point operations and in particular the first iteration of a two cycle floating point operation, the XR and XS exponent operands are not applicable.

Referring to Table 2, and Tables 5-9 once again, the optimized reciprocal computation of $x_{(m+1)}$ for the case of alpha=0, requires from Table 5 the term I for the XS mantissa operand for both the first and second cycle of a full precision double precision computation of $x_{(m+1)} = 0.5x_m(3-p_m)$. From Table 8, the term C is selected for the XS exponent operand. From Table 7, the accumulator operand is selected as term C for the second cycle of the two cycle double precision operation and zero; term A from Table 7 is selected for the first cycle. Similarly, for the case of alpha=0, the XR mantissa operand is selected from Table 6 as term B for the first cycle and as term A for the second cycle. Finally, from Table 9 the XR exponent is selected as term A for the second cycle and is not applicable for the fixed point first cycle of the two cycle double precision computation of $x_{(m+1)}$.

Table 4 illustrates the complete sequence for a double precision reciprocal square root computation. Note, that a mixed precision operation is sufficient for steps 2 through 7 and that a two cycle double precision operation is required for all steps associated with the final iteration. The round to nearest rounding mode should be enabled for all operations.

DERIVATION OF THE RECIPROCAL SQUARE ROOT COMPUTATION $x_{(m+1)} = 0.5x_m(3-p_m)$

In order to implement $x_{(m+1)}$ directly with an optimized IEEE floating point multiplier, the computation $x_{(m+1)} = 0.5x_m(3-p_m)$ must be rewritten in an equivalent form such that it's input operands XS and XR from FIG. 1 are normalized IEEE floating point numbers. In order to accomplish this as fast as possible it is imperative that no large carry look ahead or carry select additions be required to compensate the mantissa operands. This is made possible by designing the fixed point mantissa multiplier as a multiplier accumulator.

The quantity $p_m$ as indicated in the computation $$x_{(m+1)} = 0.5x_m(3-p_m)$$

where: $p_m = cx_m^2$ can be written in terms of a floating point number as $$p_m = 2^\alpha(1.fp)$$

where: alpha is the exponent value (ex-bias) and (1.fp) is the mantissa value with fp being the friction value $$fp = p_{(n-2)}p_{n-3}p_{(n-4)} \cdots p_0$$

where: n is a variable typically representing a bit of a word.

The key observation is made that for each iteration, the value of alpha is either minus one or zero. This permits the efficient implementation of $x(m+1)$ in one cycle using only a multiplier unit.

Recall, $x_m$ is an approximation for $1/c^{-.5}$. Hence, $p_m = cx_m^2$ is a quantity close to one. The particular choice of an IEEE floating point format yields two possible cases:

Case 1. alpha=$-1$
$p_m = 2^{-1}(1.1111 \ldots)$
Case 2. alpha=0
$p_m = 2^0(1.0000 \ldots)$ The improved method makes use of the fact that the quantity $p_m$ can be partitioned into the case of alpha$=-1$ or alpha$=0$ and involves the bit manipulation of the $\{1.5-0.5p_m\}$ so that $x_{(m+1)}$ can be implemented with an optimized floating point multiplier capable of operating on normalized floating point operands.

Consider now the quantity $q=\{1.5-0.5p_m\}$ for each case of alpha:

Case 1. alpha$=0$
$q=1.5-0.5p_m=1.1-(0.5)(2^\alpha)(1.\text{fp})$
$q=1.5-0.5p_m=(1.1000\ldots)-(2^{-1})(1.\text{fp})$
But $\{-2^{-1}(1.\text{fp})\}=-(00.1\text{fp})$
$\{-2^{-1}(1.\text{fp})\}=11.0\ p_{(n-2)}p_{(n-3)}\ldots p_0+2^{-n}$
Hence,
$(1.1000\ldots)-2^{-1}(1.\text{fp})=00.1\ p_{(n-2)}p_{(n-3)}\ldots p_0+2^{-n}$ Note the quantity $00.1\ p_{(n-2)}p_{(n-3)}\ldots p_0+2^{-n}$ is not normalized but two times this quantity is. Recall, a normalized quantity is highly desired in order to avoid a renormalization step prior to performing the floating point multiplication.

Therefore we can write
$\{1.5-0.5p_m\}=2^{-1}\{1.\overline{p_{(n-2)}}\ \overline{p_{(n-3)}}\ldots\overline{p_0}+2^{(-n+1)}\}$
for the case alpha$=0$.

In summary, for the case of alpha$=0$, $q=1.5-0.5p_m$ is not a normalized floating point number but $2q=2\{1.5-0.5p_m\}$ is, so that $x_{(m+1)}$ can be computed by forming the product of $x_m$ and the quantity $q=2^{-1}\{1.\overline{p_{(n-2)}}\ \overline{p_{(n-3)}}\ldots\overline{p_0}+2^{(-n+1)}\}$
where: $p_{(n-2)}\ldots p_0$ are the bitwise complement of the mantissa fraction bits of the mth iteration $p_m$.

Note: For single precision floating point numbers in the IEEE format there are 23 fraction bits and thus n$=24$. For double precision floating point numbers there are 52 fraction bits and n$=53$.

The quantity $2^{-1}$ is the exponent value that corresponds to the quantity $\{1.5-0.5p_m\}$ for the case of alpha$=0$ and is used to compensate for the fact that the mantissa needs to be multiplied by 2 to make it a normalized value.

The fixed point multiplication that corresponds to the product of $x_m$ and $$q=2^{-1}\{1.\overline{p_{(n-2)}p_{(n-3)}}\ldots\overline{p_0}+2^{(-n+1)}\}$$

consists of two operands:
$\{1.x_{(n-2)}x_{(n-3)}\ldots x_0\}$
and qman$=\{1.\overline{p_{(n-2)}p_{(n-3)}}\ldots\overline{p_0}+2^{(-n+1)}\}$ This computation can be implemented by forming the required addition of $2^{(-n+1)}$ as indicated in the brackets prior to the product formation or by breaking the quantity in brackets up and forming a fixed point multiply-accumulate operation. It is highly desirable to avoid using a full carry adder to form the quantity qman but instead use the accumulate input of the fixed point multiplier-accumulator.

Use of a fixed point multiply-accumulator for the mantissa is desirable as it eliminates the delay associated with the full adder required to form the quantity qman directly.

The multiply-accumulate product and accumulate terms are given as:
product input terms:
$\{1.x_{(n-2)}x_{(n-3)}\ldots x_0\}$
$\{1.\overline{p_{(n-2)}p_{(n-3)}}\ldots\overline{p_0}\}$
accumulate input term:
$2^{(-n+1)}\{1.x_{(n-2)}x_{(n-3)}\ldots x_0\}$ Hence, the $x_n$ mantissa term is right shifted and injected into the accumulator port to form the desired product.

Case 2. alpha$=-1$
For the case of alpha$=-1$
$q=1.5-0.5p_m=\{1.100\ldots00\}-0.5\{2^\alpha\}\{1.\text{fp}\}=1.100\ldots00-2^{-2}(1.\text{fp})$
But $-2^{-2}(1.\text{fp})=-00.01\text{fp}=11.10p_{(n-2)}p_{(n-3)}\ldots p_0+2^{(-n-1)}$
Hence,
$1.5-0.5p_m=01.00\overline{p_{(n-2)}p_{(n-3)}}\ldots\overline{p_0}+2^{(-n-1)}$ In summary, this case, $q=1.5-0.5p_m$ is a normalized floating point number and $x_{(m+1)}$ can be formed as the product of $x_m$ and $2^0\{1.00p_{(n-2)}p_{(n-3)}\ldots p_0+2^{(-n-1)}\}$ where: $\overline{p_{(n-2)}}\ldots\overline{p_0}$ are the bit complement of the mantissa fraction bits of $p_m$.

The fixed point multiplication that corresponds to the product of $x_m$ and $\{1.00\overline{p_{(n-2)}p_{(n-3)}}\ldots\overline{p_0}+2^{(-n-1)}\}$ consists of two terms:
$\}1.x_{n-2)}x_{(n-3)}\ldots x_0\}$
and $\{1.00\overline{p_{(n-2)}p_{(n-3)}}\ldots\overline{p_0}+2^{(-n-1)}\}$ This computation can be implemented by forming the required addition of $2^{(-n-1)}$ as indicated in the brackets prior to the product formation or more desirably by breaking the quantity in brackets up and forming a fixed point multiply-accumulate operation.

Use of a multiply-accumulator is more desirable as it eliminates need and the delay associated with a full adder that would otherwise be required to form the quantity $\{1.00\overline{p_{(n-2)}p_{(n-3)}}\ldots\overline{p_0}+2^{(-n-1)}\}$ directly.

The multiply-accumulate product and accumulate terms are given as:
product terms:
$\{1.x_{(n-2)}x_{(n-3)}\ldots x_0\}$
$\{1.00\overline{p_{(n-2)}p_{(n-3)}}\ldots\overline{p_0}\}$ and
accumulate term:
$2^{(-n-1)}\{1.x_{(n-2)}x_{(n-3)}\ldots x_0\}$ Hence, the $x_m$ mantissa term is right shifted and injected into the accumulator port to form the desired product.

DERIVATION OF THE RECIPROCAL COMPUTATION $x_{(m+1)}=x_m(2-p_m)$

In order to implement $x_{(m+1)}$ directly with an optimized IEEE floating point multiplier, the computation $x_{(m+1)}=x_m(2-p_m)$ must be rewritten in an equivalent form such that it's input operands XS and XR from FIG. 1 are normalized IEEE floating point numbers. In order to accomplish this as fast as possible it is imperative that no large carry look ahead or carry select additions be required to compensate the mantissa operands. This is made possible by designing the fixed point mantissa multiplier as a multiplier-accumulator.

The quantity $p_m$ as indicated in the computation $$x_{(m+1)}=x_m(2-p_m)$$

where: $p_m=cx_m$ can be written in terms of a floating point number as $$p_m=2^\alpha(1.fp)$$

where: alpha is the exponent value (ex-bias) and $(1.\text{fp})$ is the mantissa value with fp being the fraction value $$fp=p_{(n-2)}p_{(n-3)}\ldots p_0$$

The key observation is made that for each iteration, the value of alpha is either minus one or zero. This permits the efficient implementation of $x_{(m+1)}$ in one cycle using only a multiplier unit.

Recall, $x_m$ is an approximation for $1/c$. Hence, $p_m = cx_m$ is a quantity close to one. The particular choice of an IEEE floating point format yields two possible cases
alpha=0 and alpha=−1.
Case 1. alpha=−1
In this case:

$$2 - p_m = 2 - (2^{-1})(1.fp)$$
$$= 2 - 0.1fp.$$
$$= \{1.0\overline{p_{(n-2)}}\ \overline{p_{(n-3)}} \ldots \overline{p_0}\} + 2^{-n}$$

Thus the iteration becomes:
$x_{(m+1)} = x_m(2-p_m) = \{\{1.0\overline{p_{(n-2)}p_{(n-3)}} \cdot \ldots \cdot \overline{p_0}\}\{1.x_{(n-2)}x_{(n-3)}\ldots x_0\} + 2^{-n}\{1.x_{(n-2)}x_{(n-3)}\ldots x_0\}\}\{(-1)^{SX}\}\{2^{(xexp-bias)}\}$ Case 2. alpha=0.
In this case $2-p_m$ is not normalized but $2(2-p_m)$ is normalized. Thus,
$2(2-p_m) = 2\{10.+01.\overline{p_{(n-2)}p_{(n-3)}} \cdot \ldots \cdot \overline{p_0} + 2^{(-n+1)}\} = \overline{p_{(n-2)}\cdot p_{(n-3)}} \cdot \ldots \cdot \overline{p_0} + 2^{(-n+2)}$ Therefore:
$x_{(m+1)} = x_m(2-p_m) = \{\{\overline{p_{(n-2)}\cdot p_{(n-3)}} \cdot \ldots \cdot \overline{p_0}\}\{1.x_{(n-2)}x_{(n-3)}\ldots x_0\} + 2^{(-n+2)}\{1.x_{(n-2)}x_{(n-3)}\ldots x_0\}\}\{(-1)^{sx}\}\{2^{(exp-bias-1)}\}$ While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A method for performing, in a processor, a reciprocal square root computation of a value C using iterative numerical techniques, the processor having an XS input and an XR input, the method comprising:
   a) determining in input select circuitry, a value of said XS input and a value of said XR input, said XS and SR input values being a function of an iteration being processed;
   b) determining in control circuitry a selected case of a first case and a second case;
   c) generating a control signal, in said control circuitry, according to a generated opcode containing a mnemonic for a function to be performed specific to said selected case;
   d) normalizing the XS input in an XS mantissa operand format block according to said control signal to provide a normalized XS mantissa operand;
   e) normalizing the XR input in an XR mantissa operand format block according to said control signal to provide a normalized XR mantissa operand;
   f) compensating the XR input in an accumulator format block according to said control signal to create an XR formatted operand; and
   g) performing a first stage computation in a fixed point multiplier-accumulator by forming a product of said normalized XR and XS mantissa operands and then adding said XR formatted operand to said product, a result of said first stage computation representing a fixed point product of the reciprocal square root computation of the value C.

2. The method as specified in claim 1, further comprising:
   a) selecting a subcase of said selected case; and
   b) generating said control signal in said control circuitry, said control signal according to a subcase generated opcode containing a mnemonic for a function to be performed specific to said selected subcase.

3. The method as specified in claim 1, further comprising controlling twos complement and binary multiplication in said fixed point multiplier accumulator at a direction of said control signal thereby providing a twos complement and a binary result.

4. The method as specified in claim 1, further comprising performing said first stage computation by forming a product of said normalized XR and XS mantissa operands and then adding said XR formatted operand to said product in said fixed point multiplier-accumulator to form a sum output and a carry output of said fixed point multiplier-accumulator.

5. The method as specified in claim 4, further comprising performing a second stage computation in a tree-rounder and exception handler to create a floating point product having mixed precision, said performing said second stage computation comprising right shifting said fixed point product and adding said sum and carry outputs of said fixed point multiplier-accumulator, in accordance with said control signal.

6. The method as specified in claim 5, further comprising:
   a) receiving and storing said fixed point product in an initial pipeline register;
   b) clocking said initial pipeline register with a clocking signal; and
   c) transferring said fixed point product to said tree-rounder and exception handler in response to said clocking of said initial pipeline register.

7. The method as specified in claim 6, further comprising:
   a) feeding back said floating point product through a feedback loop, said floating point product fed back as an input signal to said tree-rounder and exception handler by way of said feedback loop; and
   b) performing said second stage computation by combining in said tree-rounder and exception handler said fixed point product with said floating point product of a cycle previous to a cycle generating said fixed point product, said first and second stage computations effecting a two cycle full precision computation of the reciprocal square root computation of the value C.

8. The method as specified in claim 7, wherein said combining said fixed point product with said floating point product of a cycle previous to a cycle generating said fixed point product approximately doubles precision upon every iteration.

9. The method as specified in claim 8, further comprising normalizing said floating point product by using a full double precision XS mantissa operand and a full double precision XS exponent operand and a mixed precision XR operand.

10. The method as specified in claim 7, further comprising generating said two cycle full precision computation for a final iteration of the reciprocal square root computation.

11. The method as specified in claim 7, further comprising:

a) normalizing the XS input in an XS exponent operand format block according to said control signal to provide a normalized XS exponent operand;
b) normalizing the XR input in an XR exponent operand format block according to said control signal to provide a normalized XR exponent operand;
c) forming a floating point exponent result and generating a seed exponent according to said control signal by performing a floating point number multiplication on said normalized XR and XS exponent operands in an exponent processing unit;
d) renormalizing said floating point exponent result with said seed exponent in a renormalization and exception processing unit to provide a renormalized floating point exponent result; and
e) reciprocating said renormalized floating point exponent result and said floating point product between said renormalization and exception processing unit and said tree-rounder and exception handler.

12. The method as specified in claim 11, further comprising:
a) receiving and storing said floating point exponent result and said seed exponent in an intermediate pipeline register;
b) clocking said intermediate pipeline register with a clocking output of said initial pipeline register; and
c) transferring said floating point exponent result and said seed exponent from said intermediate pipeline register to said renormalization and exception processing unit in response to said clocking of said intermediate pipeline register.

13. The method as specified in claim 12, further comprising:
a) formatting the XR input in a seed format block by implementing said function specific to said opcode generated by said control circuitry to provide an XR seed formatted operand; and
b) generating a mantissa seed value for the reciprocal square root computation of the value C, said generating performed on said XR seed formatted operand in a seed look up tables unit in accordance with said control signal.

14. The method as specified in claim 13, further comprising receiving and storing said mantissa seed value in a final pipeline register.

15. The method as specified in claim 14, further comprising:
a) receiving and storing said floating point product and said two cycle full precision computation in a main mantissa pipeline register and format block according to said control signal;
b) clocking said main mantissa pipeline register and format block with said clocking signal;
c) transferring said floating point product through said feed back loop to an input of said tree-rounder and exception handler in response to said clocking of said main mantissa pipeline register and format block; and
d) transferring a final reciprocal square root computation of the value C from an output terminal of said main mantissa pipeline register and format block to an output node of the multiplier in response to said clocking of said main mantissa pipeline register and format block.

16. The method as specified in claim 15, further comprising receiving and storing said renormalized floating point exponent result, according to said control signal, in an exponent pipeline register and format block.

17. The method as specified in claim 16, further comprising:
a) receiving and storing said mantissa seed value, according to said control signal, in a seed mantissa pipeline register; and
b) clocking said seed mantissa pipeline register with a clocking output of said exponent pipeline register and format block, said exponent pipeline register and format block clocked with a clocking output of said main mantissa pipeline register and format block; and
c) transferring said mantissa seed value to said output node after a time delay equal to a time difference between said clocking of said main mantissa pipeline register and format block and said clocking of said seed mantissa pipeline register, said time delay induced by said main mantissa pipeline register and format block and said exponent pipeline register and format block such that said mantissa seed value is transferred to said output node at a time other than a time that said floating point product and said two cycle full precision computation is transferred to said output node.

18. The method as specified in claim 15, further comprising selecting said main mantissa pipeline register and format block for 64 bit computations.

19. The method as specified in claim 15, further comprising selecting said main mantissa pipeline register and format block for 32 bit and 64 bit computations.

20. The method as specified in claim 11, further comprising performing the reciprocal square root computation of the value C by computing a reciprocal square root computation of an iteration $x_{(m+1)} = Kx_m(B-p_m)$ where the K and the B are constants, the $p(m) = 2^\alpha(1.fp)$, the 1.fp is a mantissa value with the $fp = p_{n-2)}p_{(n-3)}\ldots p_0$, where n is a variable and the alpha is equal to an exponent value of the $p_m$, and where the $x_m$ is an approximation of $1/C$ and is equal a floating point number equal to $(-1)^{SX}(2^{(exp\ bias)})(1.fx)$, where the exp is the biased exponent of the $x_m$, the bias being IEEE bias value 1023 for double precision floating point and 127 for single precision floating point, m is an integer representing the iteration being processed, the $x_{(m+1)}$ is equal to the m+1 iteration and the f(x) is $x_{(n-2)}x_{(n-3)}\ldots x_0$ for the $x_m$ fraction field, said reciprocal square root computation of said iteration having said fixed point product and said floating point product.

21. The method as specified in claim 20, further comprising determining said selected case according to said alpha.

22. The method as specified in claim 20, performing the reciprocal square root operation for the K=0.5 and the B=3, where the $p_m = cx_m^2$.

23. The method as specified in claim 22, further comprising performing the reciprocal square root operation in a following sequence of computations:
forming a first computation of $x_0$, forming a second computation of $q_0 = x_0 x_0$, forming a third computation of $p_0 = cq_0$, forming a fourth computation of $x_1 = 0.5x_0(3-p_0)$, forming a fifth computation of $q_1 = x_1 x_1$, forming a sixth computation of $p_1 = cq_1$, forming a seventh computation of $x_2 = 0.5x_1(3-p_1)$, forming an eighth computation of $q_2 = x_2 x_2$, forming a ninth computation of $q_2 = x_2 x_2$, forming a tenth computation of $p_2 = cq_2$, forming an eleventh computation of $p_2 = cq_2$, forming a twelfth computation of $x_3=0.5x_2(3-p_2)$, forming a thirteenth computation of $x_3=0.5x_2(3-p_2)$, forming a fourteenth computation of $q_3=x_3x_3$, forming a fifteenth computation of $q_3=x_3x_3$, forming a sixteenth computation of $p_3=cq_3$, forming a seventeenth computation of $p_3=cq_3$, forming an eighteenth computation of $x_3=0.5x_3(3-p_3)$, and forming a nineteenth computation of $x3=0.5x_3(3-p_3)$.

24. The method as specified in claim 23, further comprising forming the first computation with a seed lookup; forming the second, third, fourth, fifth, sixth, and seventh computations with mixed precision and with zero feed back; forming the eighth computation using a fixed point computation having full $x_2$ least signal bit's of $x_2$; forming the ninth computation with mixed precision and feedback from the eighth computation; forming the tenth computation using a fixed point computation having full C least significant bit's of $q_2$; forming the eleventh computation with mixed precision and feedback from the tenth computation; forming the twelfth computation suing a fixed point computation having full $p_2$ least significant bit's of $x_2$; forming the thirteenth computation with mixed precision and feedback from the twelfth computation; forming the fourteenth computation using a fixed point computation having full $x_3$ least significant bit's of $x_3$; forming the fifteenth computation with mixed precision having feedback form the fourteenth computation; forming the sixteenth computation suing fixed point computation having full C least significant bit's of $q_3$; forming the seventeenth computation with mixed precision and feedback from the sixteenth computation; forming the eighteenth computation using fixed point computation having full $p_3$ least significant bit's of $x_3$; forming the nineteenth computation with mixed precision and feedback from the eighteenth computation.

25. The method as specified in claim 23, further comprising generating the XS and the SR inputs in an input select circuit and generating the XS and the XR inputs in a sequence comprising:

the XR input equal to the value C with no XS input for the first computation, the XR input equal to the $X_0$ and the XS input equal to the $X_0$ for the second computation, the XR input equal to the $q_0$ and the XS input equal to the value C for the third computation, the XR input equal to the $X_0$ and the XS input equal to the $p_0$ for the fourth computation, the XR and XS inputs equal to the $x_1$ for the fifth computation, the XR input equal to the $q_1$ and the XS input equal to the value C for the sixth computation, the XR input equal to the $x_1$ and the XS input equal to the $p_1$ for the seventh computation, the XR and XS inputs equal to the $x_2$ for the eighth computation, the XR and XS inputs equal to the $x_2$ for the ninth computation, the XR input equal to the $q_2$ and the XS input equal to the value C for the tenth computation, the XR input equal to the $q_2$ and the XS input equal to the value C for the eleventh computation, the XR input equal to the $x_2$ and the XS input equal to the $p_2$ for the twelfth computation, the XR input equal to the $x_2$ and the XS input equal to the $p_2$ for the thirteenth computation, the XR and XS inputs equal to the $x_3$ for the fourteenth computation, the XR and XS inputs equal to the $x_3$ for the fifteenth computation, the XR input equal to the $q_3$ and the XS input equal to the value C for the sixteenth computation, the XR input equal to the $q_3$ and the XS input equal to the value C for the seventeenth computation, the XR input equal to the $x_3$ and the XS input equal to the $p_3$ for the eighteenth computation, and the XR input equal to the $x_3$ and the XS input equal to the $p_3$ for the nineteenth computation.

26. The method as specified in claim 20, further comprising normalizing the XS input and the XR input in said XS mantissa operand format block, XR mantissa operand format block, XS reexponent operand format block, and XR exponent operand format block according to internal tables, comprising:

TABLE 5

| | select output a53f–a0f according to select control terms A through J ( . . . denotes bit complement) | | | | | | | | |
|---|---|---|---|---|---|---|---|---|---|
| select terms | a53f | a52f | a51f | a50f | a49f | ... | a2f | a1f | a0f |
| A | 1 | xs51 | xs50 | xs49 | xs48 | ... | xs1 | xs0 | 0 |
| B | 1 | 0 | 0 | 0 | 0 | ... | 0 | 0 | 0 |
| C | $\overline{xs51}$ | $\overline{xs50}$ | $\overline{xs49}$ | $\overline{xs48}$ | $\overline{xs47}$ | ... | $\overline{xs0}$ | 0 | 0 |
| D | 1 | 0 | xs51 | xs50 | xs49 | ... | xs2 | xs1 | xs0 |
| E | 1 | xs22 | xs21 | xs20 | xs19 | ... | xs0 ... | 0 | 0 | 0 |
| F | 1 | xs54 | xs53 | xs52 | xs51 | ... | xs32... | 0 | 0 | 0 |
| G | xs31 | xs30 | xs29 | xs28 | xs27 | ... | xs0... | 0 | 0 | 0 |
| H | xs63 | xs62 | xs61 | xs60 | xs59 | ... | xs32... | 0 | 0 | 0 |
| I | $\overline{1}$ | $\overline{xs51}$ | $\overline{xs50}$ | $\overline{xs49}$ | $\overline{xs48}$ | ... | $\overline{xs1}$ | $\overline{xs0}$ | 0 |
| J | 1 | 0 | 0 | $\overline{xs51}$ | $\overline{xs50}$ | ... | $\overline{xs3}$ | $\overline{xs2}$ | $\overline{xs1}$ |

TABLE 6

| | select bf31f–b0f outputs according to a select control A through H | | | | | | | | |
|---|---|---|---|---|---|---|---|---|---|
| select terms | b31f | b30f | b29f | b28f | b27f | ... | b2f | b1f | b0f |
| A | 1 | xr51 | xr52 | xr51 | xr50 | | xr23 | xr22 | xr21 |
| B | xr20 | xr19 | xr18 | xr17 | xr16 | ... | xr0... | 0 | 0 | 0 |
| C | 1 | 0 | 0 | 0 | 0 | | 0 | 0 | 0 |
| D | 1 | 0 | 0 | 0 | 0 | | 0 | 0 | 0 |
| E | 1 | xr22 | xr21 | xr20 | xr19 | ... | xr0... | 0 | 0 | 0 |
| F | 1 | xr54 | xr53 | xr52 | xr51 | ... | xr32... | 0 | 0 | 0 |
| G | xr31 | xr30 | xr29 | xr28 | xr27 | ... | xr2 | xr1 | xr0 |

TABLE 6-continued

| select bf31f-b0f outputs according to a select control A through H | | | | | | | | |
|---|---|---|---|---|---|---|---|---|
| select terms | b31f | b30f | b29f | b28f | b27f | ... | b2f | b1f | b0f |
| H | xr63 | xr62 | xr61 | xr60 | xr59 | ... | xr34 | xr33 | xr32 |

TABLE 7

| a. Select z33-z0 bits according to control signals A through E | | | | | | | | | |
|---|---|---|---|---|---|---|---|---|---|
| select terms | z33 | z32 | z31 | z30 | z29 | z28 | z27 | z26 | ... | z0 |
| A | 0 | 0 | 0 | 0 | 0 | 0 | 0 | 0 | | 0 |
| B | 1 | xr51 | xr50 | xr49 | xr48 | xr47 | xr46 | xr45 | ... | xr19 |
| C | 0 | 1 | xr51 | xr50 | xr49 | xr48 | xr47 | xr46 | ... | xr20 |
| D | 0 | 0 | 1 | xr51 | xr50 | xr49 | xr48 | xr47 | ... | xr21 |
| E | 0 | 0 | 0 | 1 | xr51 | xr50 | xr49 | xr48 | ... | xr22 |

TABLE 8

| a. generate se10-se0 using control select terms A through F | | | | | | | | | | | |
|---|---|---|---|---|---|---|---|---|---|---|---|
| se10 | se9 | se8 | se7 | se6 | se5 | se4 | se3 | se2 | se1 | se0 | control select |
| xs62 | xs61 | xs60 | xs59 | xs58 | xs57 | xs56 | xs55 | xs54 | xs53 | xs52 | A |
| 0 | 0 | 0 | 0 | 0 | 0 | 0 | 0 | 0 | 0 | 0 | B |
| 0 | 1 | 1 | 1 | 1 | 1 | 1 | 1 | 1 | 1 | 0 | C |
| 0 | 1 | 1 | 1 | 1 | 1 | 1 | 1 | 1 | 1 | 1 | D |
| xs30 | xs29 | xs28 | xs27 | xs26 | xs25 | xs24 | xs23 | 0 | 0 | 0 | E |
| xs62 | xs61 | xs60 | xs59 | xs58 | xs57 | xs56 | xs55 | 0 | 0 | 0 | F |

TABLE 9

| generate re10-re0 output bits using control select terms A through F | | | | | | | | | | | |
|---|---|---|---|---|---|---|---|---|---|---|---|
| re10 | re9 | re8 | re7 | re6 | re5 | re4 | re3 | re2 | re1 | re0 | control term |
| xr62 | xr61 | xr60 | xr59 | xr58 | xr57 | xr56 | xr55 | xr54 | xr53 | xr52 | A |
| 0 | 1 | 1 | 1 | 1 | 1 | 1 | 1 | 1 | 1 | 0 | B |
| 0 | 1 | 1 | 1 | 1 | 1 | 1 | 1 | 0 | 0 | 0 | C |
| 0 | 1 | 1 | 1 | 1 | 1 | 1 | 1 | 1 | 1 | 0 | D |
| xr30 | xr29 | xr28 | xr27 | xr26 | xr25 | xr24 | xr23 | 0 | 0 | 0 | E |
| xr62 | xr61 | xr60 | xr59 | xr58 | xr57 | xr56 | xr55 | 0 | 0 | 0 | F |

27. The method as specified in claim 26, wherein said normalizing the XR input further comprises normalizing a full mantissa of the 1.XS53−XS0 for the XS mantissa operand and a lower 21 bit mantissa of the XR20−XR0 for the XR mantissa operand according to the iteration $x_{(m+1)}$ computation and said tables.

28. The method as specified in claim 26, further comprising forming said fixed point product having a full mantissa of the 1.XS53−XS0 for said XS mantissa operand and forming a lower 21 bit mantissa of the XR20−XR0 for said XR mantissa operand.

29. The method as specified in claim 26, further comprising normalizing said mixed precision XR operand by using an entire XR exponent operand and an XR sign field and 32 most significant bits of said XR mantissa operand for the 1.XR51−XR0 according to the iteration $x_{(m+1)}$ computation and said internal tables.

30. The method as specified in claim 26, further comprising normalizing a full mantissa and a lower 21 bit mantissa according to the iteration $x_{(m+1)}$ computation and said internal tables.

31. The method as specified in claim 26, wherein the reciprocal square root computation for the iteration $x_{(m+1)}$ when said alpha=−1 further comprises:

a) for said subcase wherein said $p_0=0$, selecting the XS mantissa operand as the select term J from said Table 5, and selecting the XS exponent operand as the select term D from said Table 8, and selecting the XR formatted operand as the select term A from said Table 7 for said first stage computation of said two cycle full precision computation and as the select term D from said Table 7 for said second stage computation, and selecting the XR mantissa operand as the select term A from said Table 6 for said second stage computation and as the select term B from said Table 6 for said first stage computation of said two cycle full precision computation, and selecting said XR exponent operand as the select term A from said Table 9 for said second stage computation; and b) for said subcase wherein said $p_0=1$, selecting said XS mantissa operand as the select term J from said Table 5, and selecting said XS exponent operand as the select term D from said Table 8, and selecting said XR formatted operand as the select term C from said Table 7 for said second stage computation and as the select term A from said Table 7 for said first stage computation, and selecting said XR mantissa operand as the select term A from said Table 6 for said second stage computation and as the select term B from said Table 6 for said first stage computation of said two cycle full precision computation, and selecting said XR exponent operand as the select term A from said Table 9 for said second stage computation, and inhibiting all fixed point operations of said XR and XS exponent operands.

32. The method as specified in claim 26, wherein the reciprocal square root computation for the iteration $x_{(m+1)}$ when said alpha=0 further comprises:

selecting the XS mantissa operand for said first and second stage computations of said two cycle full precision computation as the select term I from said Table 5, selecting the XS exponent operand as the select term C from said Table 8, and selecting the XR formatted operand as the select term C from said Table 7 for said second stage computation of said two cycle full precision computation and zero, and selecting select term A from said Table 7 for said first stage computation, and selecting the XR mantissa operand as the select term B from said Table 6 for said first stage computation and as the select term A from said Table 6 for said second stage computation, and selecting the XR exponent operand as the select term A from said Table 9 for said second stage computation, and inhibiting said XS and XR exponent operands for all fixed point operations.

33. The method as specified in claim 20, further comprising the reciprocal square root computation for the iteration $x_{(m+1)}$ when said alpha$=-1$, wherein:

a) for $p_0=0$, $x_{(m+1)} = \{\{1.00p_{(n-2)}p_{(n-3)} \ldots p_1\}\{1.x_{(n-2)}x_{(n-3)} \ldots x_0\} + 2^{(-n-1)}\{1.x_{(n-2)}x_{(n-3)} \ldots x_0\}\}(-1)^{sx}2^{(exp-bias)}$, wherein $\{\{1.00p_{(n-2)}p_{(n-3)} \ldots p_1\}\{1.x_{n-2)}x_{(n-3)} \ldots x_0\} + 2^{(-n-1)}\{1.x_{(n-2)}x_{(n-3)} \ldots x_0\}\}$ is the fixed point product and $(-1)^{sx}2^{(exp-bias)}$ is the floating point product; and b) for $p_0=1$, $x_{(m+1)} = \{\{1.00p_{(n-2)}p_{(n-3)} \ldots p_1\}\{1.x_{(n-2)}x_{(n-3)} \ldots x_0\} + 2^{(-n)}\{1.x_{(n-2)}x_{(n-3)} \ldots x_0\}\}(-1)^{sx}2^{(exp-bias)}$, wherein $\{\{1.00p_{(n-2)}p_{(n-3)} \ldots p_1\}\{1.x_{(n-2)}x_{(n-3)} \ldots x_0\} + 2^{(-n)}\{1.x_{(n-2)}x_{(n-3)} \ldots x_0\}\}$ is the fixed point product and $(-1)^{sx}2^{(exp-bias)}$ is the floating point product.

34. The method as specified in claim 20, further comprising the reciprocal square root computation for the iteration $x_{(m+1)}$ when said alpha$=0$, wherein:

$x_{(m+1)} = \{\{1.p_{(n-2)}p_{(n-3)} \ldots p_0)\}\{1.x_{(n-2)}x_{(n-3)} \ldots x_0\} + 2^{(-n+1)}\{1.x_{(n-2)}x_{(n-3)} \ldots x_0\}\}(-1)^{sx}2^{(exp-bias-1)}$, and wherein $\{\{1.p_{(n-2)}p_{(n-3)} \ldots p_0)\}\{1.x_{(n-2)}x_{(n-3)} \ldots x_0\} + 2^{(-n+1)}\{1.x_{(n-2)}x_{n-3)} \ldots x_0\}\}$ is the fixed point product and $(-1)^{sx}2^{(exp-bias-1)}$ is the floating point product.

\* \* \* \* \*

UNITED STATES PATENT AND TRADEMARK OFFICE
CERTIFICATE OF CORRECTION

PATENT NO. : 5,157,624
DATED : October 20, 1992
INVENTOR(S) : James H. Hesson

It is certified that error appears in the above-indentified patent and that said Letters Patent is hereby corrected as shown below:

Column 4, line 18, delete ".5x(m)(1 -p(m)" and insert -- .5x(m)(3-p(m)) --;

Column 4, line 31, delete "bias - )" and insert -- bias -1) --;

Column 12, line 53, delete "$1/c^{-5}$" and insert -- $1/c^{.5}$ --;

Column 14, line 14, delete $P_{(n-2)}P_{(n-3)}\cdots P_0$" and insert -- $P_{(n-2)}P_{(n-3)}\cdots P_0$ --;

Column 14, line 20, delete ")$1 \cdot x_{n-2}x_{(n-3)}\cdots x_0$}" and insert -- {$1 \cdot x_{(n-2)}x_{(n-3)}\cdots x_0$} --;

Column 19, line 39, delete "SR" and insert -- XR --.

Signed and Sealed this

Second Day of November, 1993

Attest:

BRUCE LEHMAN

*Attesting Officer*  *Commissioner of Patents and Trademarks*